UNITED STATES PATENT OFFICE.

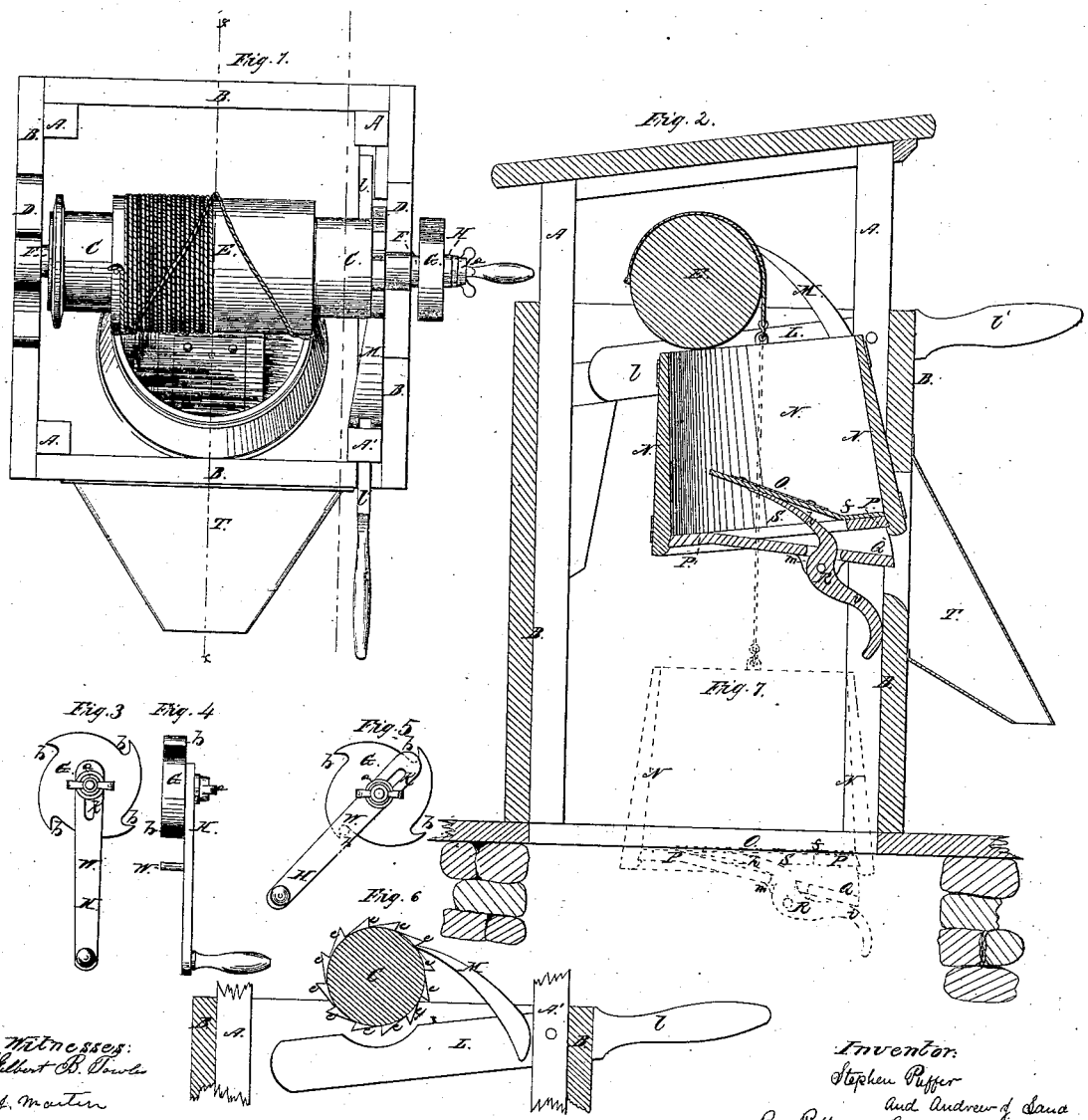

STEPHEN PUFFER AND ANDREW J. SANDS, 2D, OF OXFORD, NEW YORK.

IMPROVEMENT IN WATER-ELEVATORS.

Specification forming part of Letters Patent No. 39,245, dated July 14, 1863.

*To all whom it may concern:*

Be it known that we, STEPHEN PUFFER and ANDREW J. SANDS, 2d, of Oxford, in the county of Chenango and State of New York, have invented a new and useful Improvement in Apparatus for Drawing Water Out of Wells and Cisterns; and we do hereby declare that the following is a full and exact description thereof, reference being had to the accompanying drawings, which form a part of this specification, and of which—

Figure 1 is a top view of my improved water-elevating apparatus; Fig. 2, a vertical section of the same in the line $x\,x$ of Fig. 1; Fig. 3, an end view of the detachable sliding crank H and toothed wheel G, secured to the end of the windlass-shaft; Fig. 4, a side view of said toothed wheel G and crank H, showing the position of the engaging-pin W on the inner side of the crank; Fig. 5, an additional end view of the crank and its toothed wheel, showing their relative position when engaged or coupled; Fig. 6, a vertical section of the windlass-shaft in the line $y\,y$ of Fig. 1, showing the relative arrangement of the brake-lever L and its rigidly-attached pawl M, in combination with the windlass-shaft and the ratchet thereon.

Similar letters indicate similar parts in each of the drawings.

A frame work constructed of the corner-posts A A A A', and suitable planking, B B, supports my improved water-elevating apparatus and constitutes the inclosing-curb of the well or cistern. The journals F F' of the shaft C C are received and work in the journal-boxes D D', Fig. 1, secured upon either edge of the well-curb, and the right-hand journal F' projects beyond its journal-box D' to receive the toothed wheel G and the slotted crank H, as shown in the accompanying drawings. This slotted crank H is retained in its proper position against the face of the rigidly-secured toothed wheel G and upon the journal F' by means of a screw and nut, $a$, at the end of said journal. The elongated slot $k$, which receives the end of the elongated journal F' as a pivot, permits a longitudinal sliding movement of the crank H, which may be controlled or arrested at pleasure by the pressure of the retaining-nut $a$. A pin, W, projects inwardly from the inner face of the longer arm of the crank H, Fig. 4, over the rim of the toothed coupling-wheel G in such a position that when the crank is pushed in toward its pivot as far as the length of the slot $k$ will allow this pin W will be brought within the extreme radius of the wheel in a position to catch and engage the curved hooked teeth $b\,b$ thereon, as shown in Fig. 5. If, however, the crank H be drawn out upon its pivot or allowed to drop by its own weight to the position shown in Figs. 3 and 4, the pin W, being now beyond the radius of the wheel, will not engage or catch the teeth $b\,b$; but as they will pass clear of each other the crank will be left free from any connection with the movements of the windlass-shaft. Thus by simply sliding the crank H backward upon its pivot as far as the slot $k$ will permit the crank may be instantly coupled or uncoupled from the wheel G and windlass-shaft C. The peculiar curved and hooked shape of the engaging-teeth $b\,b$ of the wheel G causes them to take such a rigid and secure hold of the projecting pin W as to prevent all possibility of their accidental disengagement when coupled together, as shown in Fig. 5. When desirable, this coupling of the crank H with the shaft-wheel G may be rendered fixed and rigid by tightening the nut $a$, and thereby preventing the sliding movement of the crank, which would otherwise permit a detachment of the pin W from the teeth $b\,b$. If, however, the crank H be left to slide freely and unchecked upon the central pivot within its elongated slot $k$, it will, by its own weight, when the hand of the operator is removed, disengage and uncouple itself from the shaft-wheel G immediately upon attaining a vertical position below its axis, as shown in Fig. 5. By this simple device the evils attendant upon the rapid counter-revolution of the crank in ordinary well-windlasses when the bucket is let down into the well, is entirely obviated. A simple friction-brake lever, L, passes through and is pivoted within a slot cut for the purpose in the post A' of the well-curb, as shown in Fig. 1. The longer arm, $l$, of this lever passes under the windlass-shaft C near the right-hand end thereof, its upper edge being made slightly concave, so as to partially embrace the windlass-shaft. A curved arm, M, is rigidly secured to the lever L immediately in front of the pivot-post A', and, projecting upward and forward toward the shaft C, serves as a pawl to engage the rachet-teeth *e e e*, formed on the right-hand end of the windlass-shaft, at the inner edge of the curb, as is fully illustrated in Fig. 6, when, by pressure upon the short arm or handle *l'* of the lever L, the longer inner arm, *l*, is raised and made to operate as a friction-brake against the windlass-shaft C. The rigidly-secured pawl M is simultaneously thrown back and disengaged from the ratchet-teeth, *e e e*, thus permitting a free movement of the windlass shaft under the control of the brake. The moment, however, the shaft is relieved entirely from the control of the lever, the fall of the inner arm of the lever, which relieves the shaft from its action, throws forward the pawl against the ratchet *e e e* in a position to engage itself therewith. Thus the simple weight of the inner arm of the brake-lever L, acting through the rigid pawl M, prevents automatically a reverse movement of the shaft, unless at the operator's will and under his guidance and control.

In order to perfect and complete our water-drawing apparatus, we make use of a self-discharging well-bucket, N, Figs. 2 and 7, which may be constructed of wooden staves, bound by iron bands, as in ordinary well-buckets, and is fitted with a metallic bottom, P, of a novel and peculiar design. This cast-iron or otherwise metallic bottom P is made with a large square central aperture, S, which is closely covered by a leather valve, O, hinged at *f*, and made more effective in its operation by a metallic sheet riveted thereupon. This aperture S constitutes the opening of a chute, Q, whose lower side or bottom slants from the side of the aperture opposite the hinge *f* of the valve downward beneath this hinged side, and terminates beneath the outer edge of the bottom of the bucket, leaving sufficient space between this lower edge of the bucket and its own lip to allow a prompt and rapid discharge of the water therefrom. This chute may be cast in one piece with the bottom of the bucket. Its width is coincident with that of the aperture and its sides are slightly inclined. The valve O is opened at the proper moment, and the contents of the bucket discharged into the chute by means of a curved valve-lever, R, pivoted underneath the bottom of the chute Q, between ears or jaws *m*, formed thereon for this purpose, as shown in Figs. 2 and 7. The upper arm of the lever R passes through a slot in the bottom of the chute and terminates in a flat horizontal shank, *h*, of such a shape as that when the valve O is closed it rests against it and upon the bottom of the chute Q, as is clearly represented in Fig. 7. The lower arm, *i*, is curved, and extends toward the mouth of the chute in such a position as that when the valve O is closed and the upper shank, *h*, of the lever pressed down upon the bottom of the chute by the weight and pressure of water in the bucket, (see Fig. 7,) the more remote point of this lower arm, *i*, will barely coincide with a vertical line dropped from the edge of the bucket; hence this edge of the bucket serves as a guard or fender to the lower arm, *i*, of the valve-lever R, so long as the bucket remains in a vertical position, but if the bucket be inclined and this lower edge thrown up the arm *i*, being thrown forward, will be pressed down when brought in contact with the side of the well or its curb, and by causing the upper arm, *h*, to rise will thereby open the valve O and discharge the contents of the bucket. (See Fig. 2.) In order then to empty the bucket at the desired point within the curb we form a large drum, E, Figs. 1 and 2, upon the windlass-shaft C of such a size, relatively to the width of the bucket as that its diameter will be at least two-thirds as large as that of the bucket, so that when the bucket is drawn up until its edge strikes against the drum E, as shown in Fig. 2, the point of contact will serve as the fulcrum of a lever by means of which a continued application of the lifting-power upon the center of the bucket will throw its lower remote edge forward into the mouth of the conducting-spout T, as shown in Fig. 2. In attaining this position it is evident that the lower arm, *i*, of the valve-lever R will be thrown forward against the side of the curb B, and thereby cause it to open the valve O and allow the water to escape through the chute Q into the mouth of the conducting-spout T, as clearly represented in Fig. 2. The weight of the lower arm, *i*, of the valve-lever R is sufficient to overbalance the weight of the valve O; hence when the bucket reaches the water in the bottom of the well the valve, being open, permits it to be quickly filled in its descent therein. Upon being drawn up again the weight and pressure of the water immediately closes the valve and throws the lever back to its active position, as shown in Fig. 7.

The operation of my improved water-drawing apparatus is very simple, and therein consists its superior merit. The windlass-shaft is turned and the bucket of water elevated by means of the crank H, which is first slipped back until its projecting pin W catches in one of the curved and hooked teeth *b b* of the coupling-wheel G. In raising the bucket, any accidental counter-revolution of the shaft (either from the slipping of the operator's hand or otherwise) is prevented by the engagement of the pawl M with the ratchet-teeth *e e*, the pawl being made to operate by the weight of the inner arm of the brake-lever, to which it is rigidly secured. When the bucket is thus drawn up until its upper edge touches the lower portion of the drum E, its flexible bail of rope or wire, being wound upon the drum, continues the lifting strain upon its center, and thereby throws the remote lower edge of the bucket forward into the opening in the curb covered by the spout T. The projecting arm of the valve-lever R, then striking against the side of the curb, opens the valve O and permits the water to flow through the conducting-chute Q into the spout T. The bucket being thus emptied, the operator removes his hand from the crank H, and, in order to let the bucket down into the well, simply presses upon the handle of the brake-lever L. This movement releases the pawl M from the ratchet of the windlass-shaft, and permits the shaft to revolve freely, controlled, however, at will by the friction of the inner arm of the brake-lever L. Should the hand of the operator slip or be otherwise removed from the lever, the descent of the bucket will be at once checked by the automatic action of the lever L and pawl M, in connection with the ratchet *e e e*. When the windlass-shaft begins to revolve under the influence of the weight of the descending bucket, the crank H is instantly uncoupled therefrom by its own weight, independent of any attention on the part of the operator, and thus all possibility of accident from a revolution of the crank is entirely obviated.

The exceeding simplicity of our improved water-drawing apparatus and the efficient automatic operation of its several parts render it not only far superior in point of convenience and efficiency to the majority of the machines in use for this purpose, but also in a greater durability as well as of cheapness in construction.

We do not here claim as our invention the self-discharging bucket N, or any of its devices, in or by themselves; but

What we claim as our invention, and desire to secure by Letters Patent, is—

1. The longitudinally-sliding self-detachable crank H, when arranged and combined with the toothed coupling-wheel G of the windlass-shaft C, substantially in the manner and for the purpose herein set forth.

2. The self-detachable sliding crank H, the toothed coupling-wheel G, the windlass-shaft C, the rigidly-united brake-lever and pawl L and M, the automatic self-discharging bucket N, and the windlass drum E of our improved water-drawing apparatus, when said parts are arranged and combined with each other, substantially in the manner and for the purpose herein set forth.

The above specification of our improved water-drawing apparatus subscribed by us this 11th day of February, A. D. 1863.

STEPHEN PUFFER.
    ANDREW J. SANDS, 2D.

In presence of—
  HENDRICK HOUGHTON,
  JAMES H. KNIGHT.